United States Patent [19]
Fonzi et al.

[11] 3,779,855
[45] Dec. 18, 1973

[54] POROMERIC MATERIALS

[75] Inventors: Giorgio Fonzi, Saronno; Silvio Vargiu, Sesto S. Giovanni, both of Italy

[73] Assignee: Societa Italiana Resine S. I. R. S. P. A., Milan, Italy

[22] Filed: Apr. 24, 1972

[21] Appl. No.: 246,577

[30] Foreign Application Priority Data
Apr. 30, 1971    Italy .................................. 23911/71

[52] U.S. Cl.............. 161/159, 161/165, 161/DIG. 2
[51] Int. Cl. ..... B32b 3/00, B32b 31/00, D06n 3/08
[58] Field of Search ...................... 161/159, DIG. 2, 161/165

[56] References Cited
UNITED STATES PATENTS
3,262,805    7/1966    Aoki .............................. 161/DIG. 2
3,713,868    1/1973    Gordon et al .................... 117/135.5

*Primary Examiner*—William J. Van Balen
*Attorney*—Richard C. Sughrue et al.

[57] ABSTRACT

Poromeric materials for footwear and other purposes are made from a non-woven fabric, a porous layer of certain defined foamed resins, and a thin microporous surface film. The foam is obtained from lattices containing liquid unsaturated polyester resins and acrylic and/or acrylonitrile resins.

11 Claims, No Drawings

POROMERIC MATERIALS

The present invention relates to poromeric materials suitable for use in the footwear and leathergoods field.

More particularly, the present invention relates to poromeric materials constituted essentially by a non-woven fabric, a porous layer and a polyurethane or other coating.

The manufacture of synthetic poromeric materials suitable for use in the footwear field is already described for example in U.S. Pat. No. 2,723,935.

By reason of their properties, which are very similar to those of natural leather, such materials may be worked with standard footwear equipment, particularly in the manufacture of the uppers of shoes, without raising any particular problems in soling and finishing.

In contrast to leather, however, where each skin differs in thickness, strength and natural characteristics, the uniform properties of poromeric materials facilitate cutting, simplify operations and minimise waste.

An object of the present invention is to provide poromeric materials which in addition to having the characteristic features of the known poromeric materials, are characterised by improved breathing properties, resistance to wear, and tenacity.

The poromeric materials of the invention are obtained extremely economically and rapidly by very simple systems, which may be automated, by associating a non-woven fabric, a porous layer and a thin microporous surface film.

More particularly, the poromeric materials that are provided by the present invention are constituted by a non-woven fabric which serves as a backing, an intermediate porous layer produced by coagulation of a foam obtained from an aqueous latex containing liquid unsaturated polyester resins and acrylic and/or acrylonitrile resins, and a thin microporous film which serves as the surface coating.

One of the essential aspects of the present invention is the presence inside the poromeric material of a porous layer which is produced by coagulation of such a foam.

The latex is produced by agitating an aqueous emulsion containing liquid unsaturated polyester resins with an aqueous latex containing acrylic (including modified acrylic) and/or acrylonitrile resins, in such a way that the overall final concentration of resin exceeds 45 percent, and is preferably 50 to 60 percent by weight. The best results are obtained by supplying the aqueous emulsion containing liquid polyester resins in such a quantity that in the final latex the liquid unsaturated polyester resins are present to the extent of 25 to 30 percent by weight with respect to the acrylic and/or acrylonitrile resins.

The presence in addition of thickening agents makes it possible however, to use final latices with a resin concentration of less than 45 percent by weight.

The term aqueous latices containing acrylic and/or acrylonitrile resins is understood as including the products normally marketed under such designations, as homopolymers and/or copolymers, for example latices of acrylic resins, carboxylated acrylic resins, acrylonitrile resins, methacrylic resins, or methylmethacrylic resins, alone or in mixture.

The term liquid unsaturated polyester resins signifies the combination of an aryl vinyl compound with the unsaturated products which are obtained by polycondensation of polycarboxylic acids with polyhydroxy alcohols and polyhydroxyethylene glycols, the latter consisting of those products with a molecular weight of 150 to 3,000 and preferably 500 to 1,500, having the following general formula:

Under preferred conditions, use is made of those products of polycondensation which have an acid number of 5 to 50, obtained by reaction of dicarboxylic acids containing ethylenic unsaturations, such as maleic acid or fumaric acid, alone or in mixture, with a mixture of hydroxy compounds composed of the previously defined polyhydroxyethylene glycols in quantities of 2 to 50 percent by weight, the remaining percentage consisting of ethylene and/or propylene glycols.

Under such conditions, the best results are obtained when the above-listed unsaturated acids are partly substituted by phthalic acids, so that in polycondensation a molar ratio of 0.5:1 to 2:1 is maintained between the maleic and/or fumaric acids and the phthalic acids.

The resultant polycondensates are then mixed with the aryl vinyl compound, normally styrene, preferably so that in the final liquid unsaturated polyester resins, styrene is present in a quantity of 15 to 50 percent by weight with respect to the product of polycondensation.

By using suitable stabilisers, the above-mentioned liquid unsaturated polyester resins are converted to stable emulsions containing up to 50 percent and even up to 80 percent by weight of water.

The preferred stabilisers consist of aromatic organic compounds, containing in the molecule phenolic hydroxyl groups and tertiary amine groups, of the general formula:

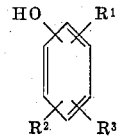

in which R1 represents a group of the type

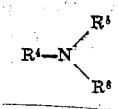

R4, R5 and R6 being hydrocarbon radicals containing from one to four carbon atoms; R2 representing hydrogen or having the same significance as R1; and R3 representing hydrogen or phenolic hydroxyl or having the same significance as R1.

Among the stabilisers belonging to this general class, the best results are provided by: 2, 4, 6-tris(dimethylaminomethyl) phenol; 2, 4, 6-tris(diethylaminomethyl) phenol; 2, 4, 6-tri(methylethylaminomethyl) phenol and 2, 4, 6-tris(dimethylaminoethyl) phenol. Such stabilisers are preferably present in the emulsion in such a quantity that the ratio of the number of tertiary amine groups in the stabiliser to the number of free carboxyl groups in the product of condensation is from 0.1:1 to 1:1. As stabilising agents, however, it is also possible to use mono, di and tri-esters of fatty acids with non-ionic polyhydroxy alcohols, such as sorbitan sesquioleate, sorbitan monooleate, sorbitan monostearate, sorbitan monopalmitate, propylene glycol monolaurate, diethylene glycol mono-oleate, diethylene glycol monostearate, and glycerine monostearate, alone or in mixture with one another.

As stabilising agents, it is also possible to use alkali metal or alkaline earth metal, salts of arylated fatty acids, such as the sodium salts of the styrenated oleic acid, phenylstearic acid, naphthylstearic acid anhydride, and toluylstearic acid anhydride, alone or in mixture with one another.

The above-mentioned stabilising agents are preferably used in quantities between 0.1 and 10 percent by weight of the final emulsion.

For the purposes of the present invention, in the final aqueous latices obtained after blending of the emulsions of liquid unsaturated polyester resins and acrylic and/or acrylonitrile latices, additives which are normally added to the latices themselves, for example wetting agents, surface active agents, stabilisers, cross-linking agents, foaming agents, inert fillers, etc., may also be present.

Air is then incorporated into such latices in a known manner, for example in a homogeniser, preferably in such a quantity that the volumetric ratio of latex to air is from 4:1 to 1:2 and preferably 2:1.

The resultant foam is spread out into a thin layer of microporous surfacing film, for example polyurethane film, prepared by known techniques from polyurethane resins which are suitable for the purpose, for example in quantities of 10 to 50 g/sq.m. of surface area.

The foam is coagulated on the surfacing film, for example polyurethane, according to the techniques already known for the purpose, for example by heating, gelling or irradiation.

In the preferred form, coagulation is carried out in a stream of hot air at a temperature of 70° to 160°C.

In another embodiment, the action of heat is combined with the action of catalysts which are normally used in the art for hardening unsaturated liquid polyesters.

For the purpose, it is possible to use for example lauroyl peroxide, benzoyl peroxide, methylethylketone peroxide or cumene hydroperoxide, normally in a quantity of 0.1 to 3 percent by weight with respect to the liquid unsaturated polyester resin.

In addition to the peroxides, activators may also be present, consisting of metal salts, such as for example salts of cobalt, zinc, vanadium or manganese and/or basic organic compounds such as dimethyl aniline. Finally, by means of a commercial adhesive, a non-woven fabric is glued onto the surface of the porous layer thus obtained, so as to produce materials having a controlled gradient of density, a smoothed and waterproof outer surface and a comfortable and resistant inner surface.

Such materials are then rolled, embossed, dyed and finished in order to produce the desired appearance.

In another embodiment of the present invention, the foam is spread directly onto the non-woven fabric in the above specified proportions and the microporous surface coating is applied at a further stage to the surface of the porous layer formed after the foam has coagulated.

The methods of application may be that of gluing already preformed microporous sheets or that of forming the microporous sheets directly on the surface of the porous layer or that of distributing the surface material in the form of small polyurethane particles, using a half-tone printing machine, or other methods known to men skilled in the art.

In another embodiment of the present invention, the foam is spread either onto the non-woven fabric or into a thin layer of microporous film which has been separately prepared. After the foam has coagulated, the products obtained are joined by being calendered while hot, so that their foamed parts, brought into contact, adhere and become fixed to each other.

The quantity of foam spread onto the non-woven fabric and onto the surface film should be such that the above-specified proportions are to an overall extent maintained.

For the purposes of the present invention, great importance is also attributed to the use of non-woven fabrics, in view both of their supporting function and of the properties of mechanical strength and comfort which they impart to the finished poromeric material.

The term non-woven fabrics denotes those materials, known in the art, which are not manufactured by the known process for producing woven fabrics, in other words by the interweaving of weft and warp, but by the fixing of a fleece of fibres.

As fibres, it is possible to use natural fibres, for example cotton or wool, artificial fibres, for example rayon, or man-made fibres, for example polyamide, acrylic or polyester fibres, alone or in mixture with one another.

The thickness of the non-woven fabrics is preferably 0.2 to 2.5 mm, advantageously 0.4 to 1.2 mm, while the density of the fleece may be varied rather widely, but is preferably 0.40 to 0.50 g/cu.cm.

The microporous surface coating imparts to the poromeric material watertightness and, after suitable processing, the outer appearance, which may be smooth, grained or nap.

For the manufacture of the microporous surface coating, in addition to the already mentioned polyurethane resins, which are the preferred surface materials, it is possible to use other types of resins such as for example cellulose esters (acetate, butyrate, nitrate, etc.), acrylic or acrylonitrile resins, and other resins known in the art.

The poromeric materials which are thus produced, in addition to exhibiting the characteristics of known poromeric materials, are characterised by improved properties of breathing, resistance to wear and strength.

Probably, these properties are in strict relation to the presence in the porous layer of an extremely high number of pores of very small size, all distributed evenly and uniformly. We do not wish to confine ourselves to any theory, but this distribution would seem to be due not only to the presence of air in the foam in a clearly defined ratio but also to the fact that during coagulation there is a certain release of water from the polyesters, since it is known that polyesters intimately incorporate or enclose dispersed water as they harden.

Poromeric materials according to the present invention will now be described in the following examples, which do not however constitute any limitation on the invention itself.

EXAMPLE 1

Initially, an emulsion was prepared from a liquid unsaturated polyester resin.

For this purpose, dipropylene glycol, maleic anhydride and polyoxymethlene glycol (molecular weight 1500) were initially placed in a glass vessel in a molar ratio of 1:1:0.03 and heated in a stream of inert gas to 160°C, under agitation. The temperature was then raised to 195°C gradually over approximately 3 hours, resulting in a product with an acid number of 55 to 60.

The flow of inert gas was then increased and, at a Gardner viscosity of Q-T (measured at 25°C in a 70 percent toluene solution) and an acid number of 40, the mixture was cooled to 150°C.

After hydroquinone had been added in a quantity of 100 ppm, the mixture was diluted with styrene, the working temperature being 100°C, until the dry content equalled approximately 50 percent. To 100 parts by weight of the product were added 0.05 parts by weight of a 5 percent quarternary anionic salt in styrene and 2 parts by weight of 5 percent cobalt octoate.

The resulting mixture was homogenised and then 100 parts by weight of non-demineralised water with a pH of approximately 6 were added, the agitator being kept at 1500 r.p.m.

Thus, a stable emulsion was obtained, to which 2 parts by weight methylethylketone peroxide were added.

This emulsion was mixed under agitation with a 60 percent ethyl polyacrylate latex so that the overall final concentration of resin in the new latex obtained was 60 percent by weight and the unsaturated polyester resin was present in the new latex to the extent of 26 percent by weight with respect to the ethyl polyacrylate.

300 g of this latex were blended with 15 g of a cross-linking agent consisting of the product of condensation of melamine with formaldehyde (Aerotex distributed by American Cyanimid), 25 g of a polyglycol humectant (the commercial product Triton X-100), 5 g of a polythioether polyester (the Bayer product Emulvin S), 15 g of a soap solution as a foaming agent, 5 g ammonium chloride, 5 g of Lipton dye from Badische Anilin and 120 g kaolin flour.

Air was intimately incorporated in the product formed, so that the volumetric ratio of product to air was approximately 3:1. The foam obtained was spread onto a non-woven fabric with a doctor blade so that the thickness of the foam was approximately 1 mm.

The non-woven fabric used had a density of 0.45 per cc and a thickness of 0.6 mm and had first been appropriately roughened on both faces in order to improve its handle.

The non-woven fabric, coated with foam, after being dried in an oven at a temperature of 70° to 80°C, was subjected to hot calendering in order to stabilise the foam, and was then treated with warm air at 160°C for 3 minutes.

The total thickness of the product obtained was 1.1 mm.

Half-tone engraved rollers applied to this product, in a number of passes, a thickness of 0.1 mm of a polyurethane polymeric composition dissolved in dimethylformamide (the product Estane by Goodrich).

The manufactured product obtained after removal of the dimethylformamide by evaporation at moderate temperature exhibited the characteristic features shown in Table 1 below.

EXAMPLE 2

A foam was prepared as in Example 1. A non-woven fabric was then used which had a density of 0.45 g per cc and a thickness of 1 mm, which had been roughened on one surface only.

To the non-roughened surface, a doctor blade applied a uniform layer of the foam, in a thickness of approximately 0.8 mm. After drying in an oven at a temperature of 60° to 70°C, the product obtained was hot-calendered in order to stabilise the foam.

Separately, using known techniques, a polyurethane film 0.1 mm thick was prepared on a transfer paper.

Onto this film, still supported by the transfer paper, was applied a thin layer of the foam prepared as above and the whole was dried at a temperature of 50° to 60°C. This product was then hot rolled to join it to the product obtained from the non-woven fabric by application of the foam as above. The blending was carried out in such a way that the foam part of the non-woven fabric and of the polyurethane film brought into contact with each other adhered and became fixed to each other.

The product formed, after treatment with hot air at 160°C for 3 minutes was cooled and the transfer paper which had been covering the outside of the polyurethane film was removed.

The manufactured product obtained, constituted in cross-section by a non-woven fabric, an intermediate porous layer and a polyurethane surface finish, exhibited the characteristic features shown in Table 1.

EXAMPLE 3

Using known techniques, a polyurethane film 0.1 mm thick was prepared on a transfer paper. To this film, still carried by the transfer paper, was applied a layer of approximately 1 mm of the foam prepared as in Example 1 and the whole was dried at a temperature of 50° to 60°C.

The product obtained, after being completely dried with hot air, was rolled out hot and detached from the transfer paper.

Separately, a non-woven fabric having a density of 0.40 g per cc and a thickness of 0.7 mm, was sprayed with a thin coating of polyurethane adhesive.

The above-described product was applied to the still-wet material so that the foam layer was in contact with the adhesive on the non-woven fabric.

The manufactured product obtained, after being pressed out on rollers and heated, was constituted in section by a non-woven fabric, an intermediate foamed resin body and a polyurethane surface film, and exhibited the characteristic features shown in Table 1.

EXAMPLE 4

Initially, a foam was produced.

For this purpose, an emulsion of liquid unsaturated polyester resin as in Example 1 was blended under agitation with a 60 percent ethyl-polyacrylate latex so that the final concentration of resin in the new latex obtained was 60 percent by weight and the unsaturated polyester resin was present in the new latex to the extent of 28 percent by weight of the ethylpolacrylate. The same procedure was then adopted as in Example 1, a manufactured product finally being obtained which had the characteristic features listed in Table 1.

EXAMPLE 5

Initially, a foam was prepared.

For this purpose, an emulsion of liquid unsaturated polyester resin as in Example 1 was blended under agitation with a 60 percent ethylpolyacrylate latex so that the overall concentration of resin in the new latex obtained was 60 percent by weight and the unsaturated polyester resin was present in the new latex to the extent of 30 percent by weight of the ethylpolyacrylate. The same procedure was then adopted as in Example 1, a manufactured product finally being obtained which had the characteristic features listed in Table 1.

TABLE 1

| Characteristic features | Ex. 1 | Ex. 2 | Ex. 3 | Ex. 4 | Ex. 5 |
|---|---|---|---|---|---|
| Tensile strength kg/sq. cm.: | | | | | |
| Long | 11.5 | 13.3 | 11.9 | 12.7 | 11.3 |
| Transv | 10.2 | 11.7 | 10.7 | 10.4 | 10.2 |
| Elongation %: | | | | | |
| Long | 25 | 26 | 25 | 25 | 28 |
| Transv | 28 | 32 | 28 | 26 | 27 |
| Tear strength: kg/mm | | | | | |
| Long | 2.4 | 2.3 | 2.5 | 2.5 | 2.4 |
| Transv | 2.5 | 2.5 | 2.6 | 2.6 | 2.4 |
| Fatigue limit per 1000: | 700 | 700 | 700 | 700 | 700 |
| Resistance to abrasion: | 9 | 9 | 9 | 9 | 9 |
| Permeability to water: vapour mg/sq.cm/hr. | 3.4 | 3.5 | 2.7 | 3.6 | 3.2 |

These tests were carried out according to standard procedures in use at the Italian Leather and Tanning Agents Industry Research Establishment (Stazione Sperimentali per l'Industria delli Pelli e delle Materie Concianti)

What we claim is:

1. Poromeric materials consisting of a non-woven fabric backing, an intermediate porous layer and a microporous film as a surface covering, characterised in that the intermediate porous layer is produced by coagulation of a foam obtained by dispersing air in an aqueous latex containing liquid unsaturated polyester resins and acrylic and/or acrylonitrile resins, the liquid unsaturated polyester resins being in a quantity of from 25 to 30 percent by weight of the acrylic and/or acrylonitrile resins and being constituted by the combination of an aryl vinyl compound with the unsaturated products which are obtained by polycondensation of polycarboxylic acids with polyhydroxy alcohols and polyhydroxyethylene glycols, the latter consisting of those products with a molecular weight of 150 to 3,000 and preferably 500 to 1,500, having the following general formula:

$$HOCH_2-(CH_2OCH_2)_n-CH_2OH$$

2. Poromeric materials as in claim 1, characterised in that coagulation is carried out at a temperature of 90° to 160°C, using foam produced by dispersing air into an aqueous latex with an overall concentration of liquid unsaturated polyester resins and acrylic and/or acrylonitrile resins in excess of 45 percent by weight, the quantity of air being such that the volumetric ratio of latex to air is from 4:1 to 1:2.

3. Poromeric materials as in claim 1, characterised in that the overall concentration of resins in the latex is from 50 to 60 percent by weight while the air is dispersed in such a quantity that the volumetric ratio of latex to air is around 2:1.

4. Poromeric materials as in claim 1, characterised in that the foams are coagulated after having been spread onto the non-woven fabric or into the microporous film in a quantity of between 50 to 500 g per sq. m of the surface area.

5. Poromeric materials as in claim 1, characterised in that the liquid unsaturated polyester resins are constituted by:

a product of polycondensation having an acid number of 5 to 50, obtained from maleic and/or fumaric acid and polyhydroxy compounds, the said polyhydroxy compounds consisting of 2 to 50 percent by weight of polyoxyethylene glycols of a molecular weight of 150 to 3000 and preferably 500 to 1500, the remainder ethylene and/or propylene glycol;

styrene in a quantity of 15 to 50 percent by weight with respect to the product of polycondensation;

an emulsion stabiliser selected from compounds having the following general formula:

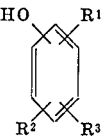

in which R1 represents a group of the type

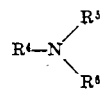

R4, R5 and R6 being hydrocarbon radicals containing from one to four carbon atoms; R2 representing hydrogen or having the same significance as R1; and R3 representing hydrogen or phenolic hydroxyl or having the same significance as R1; the said stabiliser being present in the composition in such a quantity that the ratio of the number of tertiary amine groups in the stabiliser to the number of free carboxyl groups in the product of polycondensation is 0.1:1 to 1:1.

6. Poromeric materials as in claim 5, characterised in that as stabilisers for the liquid unsaturated polyester resins, 2,4,6-tri(dimethyla minomethyl) phenol, 2,4,6-tri(diethylaminomethyl) phenol, 2,4,6-tri (methylethylaminomethyl) phenol or 2,4,6-tri(dimethylaminoethyl) phenol is used.

7. Poromeric materials as in claim 1, characterised in that in the liquid unsaturated polyester resins, maleic and/or fumaric acids are partially substituted by phthalic acids so that the molar ratio of the maleic and/or fumaric acids to the phthalic acids is from 0.5:1 to 2:1.

8. Poromeric materials as in claim 1, characterised in that the liquid unsaturated polyester resins are used as stable emulsions containing up to 80 percent by weight of water.

9. Poromeric materials as in claim 1, characterised in that coagulation is carried out at a temperature of 90° to 260°C in the presence of a peroxide in a quantity of 0.1 to 3 percent by weight of the liquid unsaturated polyester, the said peroxide being preferably selected from the class consisting of lauroylperoxide, methylethylketone peroxide and cumene hydroperoxide.

10. Poromeric materials as in claim 1, characterised in that the non-woven fabrics are used which are obtained from natural, artificial or man-made fibres, alone or in mixture with one another, with a thickness of 0.2 to 2.5 mm, preferably 0.4 to 1.2 mm, and with a fleece density of 0.40 to 0.50 g/cc.

11. Poromeric materials as in claim 1, characterised in that products obtained from polyurethane resins, esters of cellulose or acrylic or acrylonitrile resins, are used as a microporous surface coating.

* * * * *